United States Patent
Polak et al.

(10) Patent No.: US 7,344,653 B2
(45) Date of Patent: Mar. 18, 2008

(54) METHOD FOR PRODUCING AND MAGNETISING A BITUMEN FILM CONTAINING MAGNETIC POWDER

(75) Inventors: Josef Polak, Bodenheim (DE); Christoph Freist, Bielefeld (DE); Gerd Mannebach, Worms-Abenheim (DE); Ernst Hotz, Schönau (DE); Joachim Oster, Niedernhausen (DE)

(73) Assignee: CWW-Gerko Akustik GmbH, Worms (DE)

( * ) Notice: Subject to any disclaimer, the term of this patent is extended or adjusted under 35 U.S.C. 154(b) by 628 days.

(21) Appl. No.: 10/481,820

(22) PCT Filed: Jun. 25, 2002

(86) PCT No.: PCT/DE02/02272

§ 371 (c)(1),
(2), (4) Date: Jul. 21, 2004

(87) PCT Pub. No.: WO03/000490

PCT Pub. Date: Jan. 3, 2003

(65) Prior Publication Data

US 2004/0238072 A1    Dec. 2, 2004

(30) Foreign Application Priority Data

Jun. 25, 2001    (DE) .................... 101 30 026

(51) Int. Cl.
*H01F 1/113*    (2006.01)
*H01F 1/08*    (2006.01)

(52) U.S. Cl. .................. 252/62.53; 148/104; 148/103; 148/108

(58) Field of Classification Search .............. None
See application file for complete search history.

(56) References Cited

U.S. PATENT DOCUMENTS

| 3,243,374 | A |   | 3/1966  | Gillard          |         |
|-----------|---|---|---------|------------------|---------|
| 4,435,485 | A |   | 3/1984  | Nakajima et al.  |         |
| 4,833,018 | A | * | 5/1989  | Ruehl et al.     | 428/332 |
| 5,002,677 | A |   | 3/1991  | Srail et al.     |         |
| 6,152,259 | A | * | 11/2000 | Freist et al.    | 181/290 |

FOREIGN PATENT DOCUMENTS

| DE | 31 33 440 A1 |   | 5/1982  |
|----|--------------|---|---------|
| DE | 37 11 810 A1 |   | 10/1988 |
| DE | 38 25 494 A1 |   | 2/1990  |
| DE | 3825494 A1   | * | 2/1990  |
| DE | 42 28 519 A1 |   | 3/1994  |
| DE | 100 40 439 A1|   | 5/2001  |
| EP | 0 285 740 A2 |   | 10/1988 |
| FR | 2 561 582    |   | 9/1985  |

OTHER PUBLICATIONS

Machine Translation of DE 3825494 A1.*

* cited by examiner

*Primary Examiner*—John P. Sheehan
(74) *Attorney, Agent, or Firm*—Crowell & Moring LLP

(57) ABSTRACT

A bitumen film containing magnetic powder is heated prior to magnetization to a temperature enabling the magnetic powder particles to be oriented according to the effect of the magnetic field. The bitumen film is sufficiently cooled after magnetization in order to preserve the magnetization, whereby the orientation of the magnetic powder particles, which is adjusted during magnetization, is maintained.

8 Claims, 1 Drawing Sheet

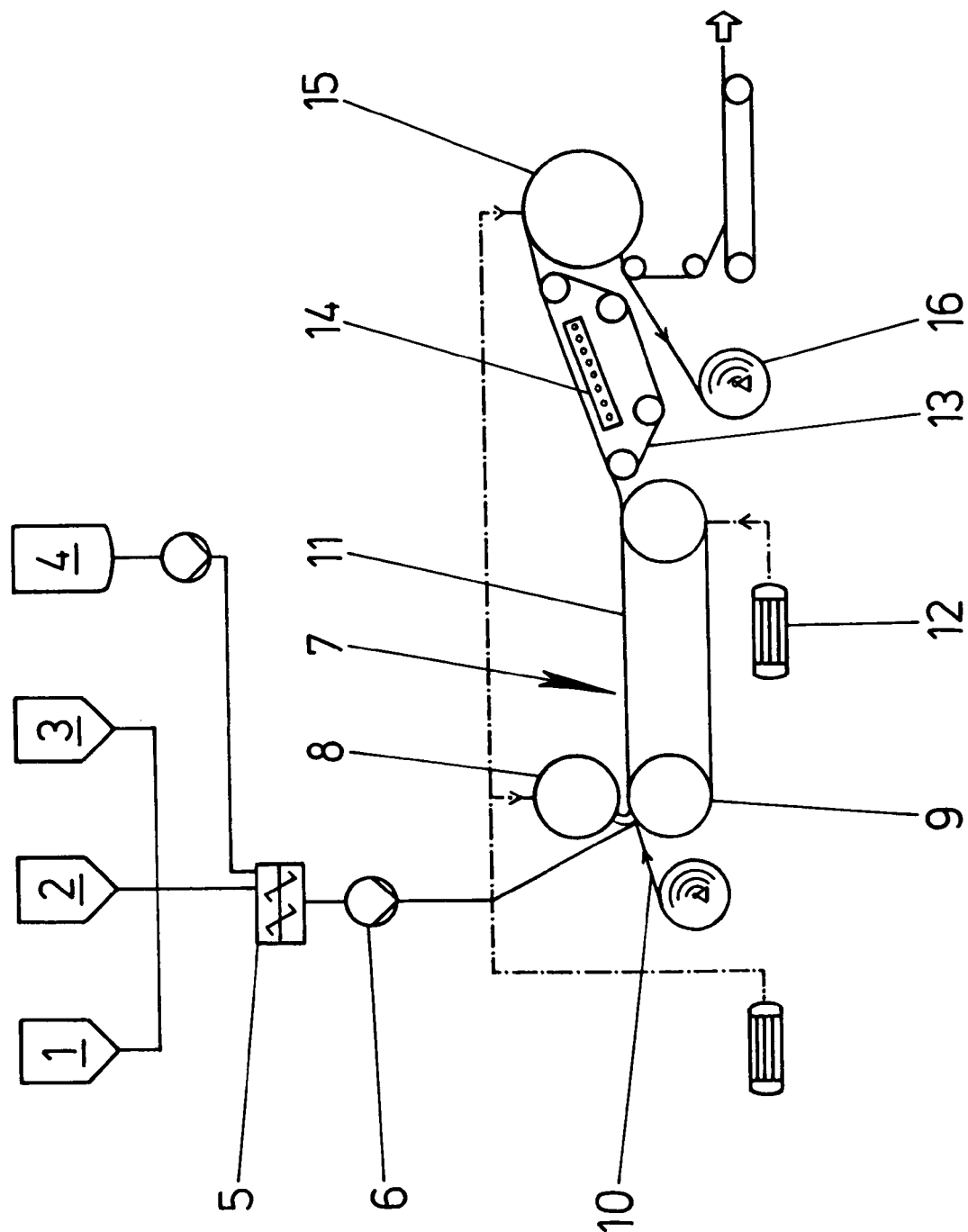

METHOD FOR PRODUCING AND MAGNETISING A BITUMEN FILM CONTAINING MAGNETIC POWDER

BACKGROUND AND SUMMARY OF THE INVENTION

The invention relates to a process for the manufacture and magnetisation of a magnetic powder containing bitumen foil, with which the magnetic powder is magnetised in a magnetisation station by a strong magnetic field.

A process of the aforementioned type is described in DE 37 11 810 A1. The magnetic powder, which is an isotropic material such as barium ferrite powder, is used in such bitumen foils so as to provisionally fix the damping foils in position during the installation until they are finally bonded to the backing during the passing through a furnace by the melting and re-hardening of an adhesive. The publication mentions that the ferrite particles, after manufacture of the foil, are converted into directional permanent magnets. This takes place at room temperature.

In practice it was found that often the magnetic forces of such bitumen foils are not sufficient or that a relatively large quantity of magnetic powder is required in order to achieve adequate magnetic forces. However, especially for reasons of weight it is desirable that the quantity of magnetic powder is as little as possible, since such bitumen foils are very frequently used in motor vehicles, where an increase in weight leads to an increase in fuel consumption and reduces the acceleration power.

The object of the invention is to develop a process of the aforementioned type, which leads to bitumen foils that at identical magnetic forces have a significantly lower weight per unit area than the bitumen foils manufactured according to the known process.

According to the invention this object is achieved in that prior to the magnetisation the bitumen foil is heated to such a temperature that the magnetic powder particles can align themselves by the effect of the magnetic field and in that immediately after the magnetisation the bitumen foil is cooled sufficiently in order to maintain the magnetisation.

By the heating of the bitumen foil according to the invention prior to the magnetisation, the magnetic powder particles are able to orient themselves in a preferred direction, which is preserved by the subsequent cooling. As a result considerably less magnetic powder is required to achieve an identical magnetic force as with bitumen foils according to the state of the art. With the bitumen foil according to the aforementioned DE 37 11 810 A1, for example, for its use in motor vehicles a magnetic powder portion of 60-70% by mass is required, whereas for a bitumen foil according to the process of the invention 30-40% by mass suffice. On the whole, the invention results in a weight saving of approximately 20% at an identical magnetic force and while retaining or even increasing the acoustic properties.

The process can be carried out in a particularly effective and economic manner when prior to the magnetisation the bitumen foil is heated to a temperature of over 100° C. and thereafter is cooled to at least approximately 70° C. By this cooling to at least approximately 70° C., the magnetisation and orientation is "frozen in". Furthermore, at higher temperatures, when pulling the bitumen foil off a roller that is cooling it, a disorientation of the individual grains of the magnetic powder would occur and as a result thereof the achieved magnetisation would be reduced.

The energy requirement for the implementation of the process according to the invention is particularly low when according to a further development of the invention only a layer of the bitumen foil of approximately 1 mm thickness is heated to above 100° C.

The process can be carried out in a particularly simple manner when the magnetisation and cooling take place on a water-cooled magnetic roller that comprises permanent magnets.

Particularly strong magnetic forces can be obtained with a relatively small quantity of magnetic powder when as magnetic powder an anisotropic material is used.

It is advantageous when as magnetic powder anisotropic barium or strontium is used.

A sticking of the bituminous compound and the foil produced therefrom to a steel band of a steel band plant can be excluded when the bituminous compound for the manufacture of the bitumen foil is rolled by means of calibrating rollers onto a carrier foil that covers the steel band.

The carrier foil preferably is a polyester foil.

The process according to the invention can be carried out in various ways. For the further clarification of its basic principle, reference is made in the following to the drawing.

BRIEF DESCRIPTION OF THE DRAWING

The FIGURE shows a system for the manufacture and magnetization of a magnetic powder containing bitumen foil in accordance with the principles of the present invention.

DETAILED DESCRIPTION OF THE DRAWING

The drawing shows four silos 1-4, in which the raw materials required for the manufacture of the bitumen foil are stored. These raw materials are fed to a mixer 5, where they are mixed together thoroughly. The main component of the mixture is an anisotropic material, especially Ba-ferrite or Sr-ferrite.

On completion of the required mixing time the compound produced in this manner is fed by means of a pump 6 to a steel band plant 7 with calibrating rollers 8, 9 and a revolving steel band 11, and there is rolled into a sheet of the required thickness and width. To prevent the hot compound from sticking to the not cooled steel band 11 of the steel band plant 7, or so as to be able to pull the sheet off the steel band 11, a polyester foil 10 is rolled on. The top calibrating roller 8 is cooled, so that here the sheet can be pulled off the calibrating roller 8.

The produced foil is now transported by means of the steel band 11, which is heated by means of thermal oil heating 12, to a heating band 13, where it is heated to approximately 140° C. above a heating field 14. Only a layer thickness of approximately 1 mm need be heated through here. For energy-technical reasons the other part of the foil can have a lower temperature. The polyester foil 10 that is used serves as carrier foil for the transport. A bitumen foil with such a temperature could otherwise not be transported and passed over between various plant parts.

From the heating band 13 the bitumen foil goes to a magnetisation station 15. Here the hot bitumen foil is magnetised by means of a large permanent magnet roller (diameter 1.000 mm) with internal and external cooling and at the same time is cooled to approximately 70° C. Seeing that after the cooling the bitumen foil has again sufficient inherent strength, the polyester foil 10 can be pulled off by means of a take-up reel 16.

Next the bitumen foil is coated, depending on the requirements of its use, with a sealing layer, hot melt or self-adhesive bonding agent. Next parts are punched out in different geometrical shapes, which then can be used in the first instance in the motor vehicle industry as sound insulation foils.

LIST OF REFERENCE NUMERALS

1 Silo
2 Silo
3 Silo
4 Silo
5 Mixer
6 Pump
7 Steel band plant
8 Calibrating roller
9 Calibrating roller
10 Polyester foil
11 Steel band
12 Thermal oil heating
13 Heating band
14 Heating field
15 Magnetisation station
16 Take-up reel

The invention claimed is:

1. A process for the manufacture and magnetization of a magnetic powder containing bitumen foil, comprising:
   heating a bitumen foil containing magnetic powder to such a temperature that the magnetic powder particles can align themselves by the effect of a magnetic field;
   magnetizing the magnetic powder in a strong magnetic field; and
   cooling the bitumen foil sufficiently in order to maintain the magnetization.

2. A process according to claim 1, in which prior to the magnetization the bitumen foil is heated to a temperature of over 100° C. and after the magnetization is cooled to approximately 70° C. or cooler.

3. A process according to claim 1 or 2, in which only a layer of the bitumen foil of approximately 1 mm thickness is heated to above 100° C.

4. A process according to claim 1 or 2, in which the magnetization and cooling take place on a water-cooled magnetic roller that comprises permanent magnets.

5. A process according to claim 1 or 2, in which an anisotropic material is used as magnetic powder.

6. A process according to claim 5, in which anisotropic barium ferrite or strontium ferrite is used as magnetic powder.

7. A process according to claim 1 or 2, in which a bituminous compound for the manufacture of the bitumen foil is rolled by means of calibrating rollers onto a carrier foil that covers a steel band.

8. A process according to claim 7, in which the carrier foil is a polyester foil.

* * * * *